United States Patent
Ekambaram

(12) United States Patent (10) Patent No.: US 10,749,784 B2
Ekambaram (45) Date of Patent: Aug. 18, 2020

(54) TEST SYSTEM AND METHOD FOR IOT E2E TESTING

(71) Applicant: Rohde & Schwarz GmbH & Co. KG, Munich (DE)

(72) Inventor: Prabhakaran Ekambaram, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 90 days.

(21) Appl. No.: 16/023,209

(22) Filed: Jun. 29, 2018

(65) Prior Publication Data

US 2020/0007428 A1 Jan. 2, 2020

(51) Int. Cl.
| | |
|---|---|
| H04W 4/00 | (2018.01) |
| H04L 12/26 | (2006.01) |
| H04L 12/24 | (2006.01) |
| H04W 4/70 | (2018.01) |
| H04L 29/12 | (2006.01) |

(52) U.S. Cl.
CPC .......... H04L 43/50 (2013.01); H04L 41/0806 (2013.01); H04L 41/0886 (2013.01); H04L 41/145 (2013.01); H04L 61/1511 (2013.01); H04W 4/70 (2018.02)

(58) Field of Classification Search
None
See application file for complete search history.

(56) References Cited

U.S. PATENT DOCUMENTS

| | | | | |
|---|---|---|---|---|
| 2016/0156614 | A1* | 6/2016 | Jain | H04L 63/0876 726/6 |
| 2016/0337216 | A1* | 11/2016 | Kaushik | H04W 4/70 |
| 2016/0359664 | A1* | 12/2016 | Malegaonkar | G06F 8/34 |
| 2017/0337242 | A1* | 11/2017 | Hu | H04L 29/08 |
| 2018/0302947 | A1* | 10/2018 | Yan | H04W 76/27 |

FOREIGN PATENT DOCUMENTS

WO WO2017045727 A1 3/2017

* cited by examiner

*Primary Examiner* — Zewdu A Beyen
(74) *Attorney, Agent, or Firm* — Potomac Technology Law, LLC

(57) ABSTRACT

A test system for Internet-of-Things (IoT) end-to-end (e2e) testing is provided. The test system comprises a network simulator and a device under test. The device under test is adapted to initiate a communication with the network simulator and to send a Domain Name System (DNS) query and/or a Message Queue Telemetry Transport (MQTT) request to the network simulator. The network simulator is adapted to determine a platform according to which the device under test intends to communicate based on the Domain Name System query and/or the Message Queue Telemetry Transport request.

18 Claims, 3 Drawing Sheets

TEST SYSTEM AND METHOD FOR IOT E2E TESTING

TECHNICAL FIELD

The invention relates to a test system and a corresponding method for Internet-of-Things (IoT) end-to-end (e2e) testing.

BACKGROUND

Generally, in times of an increasing number of applications providing Internet-of-Things or similar capabilities, there is a growing need of a test system and a corresponding method, such as for verifying correct functioning of the applications in an efficient and flexible manner.

The publication WO2017045727A1 discloses a method performed by a Machine-to-Machine (M2M) server for managing communication with a M2M device. The method comprises the steps of configuring the M2M device with a finite number of predetermined states and predetermined transitions for moving the M2M device into one of its predetermined states, and sending a message to the M2M device for executing at least one of the predetermined transitions. As it can be seen, due to the fact that at least each of the states and the transitions is predetermined, the usage of the method disadvantageously leads to a limited flexibility, and thus also to a reduced efficiency.

What is needed, therefore, is a test system and a corresponding test method for Internet-of-Things (IoT) end-to-end (e2e) testing, which ensure both a high flexibility and an increased efficiency.

SOME EXAMPLE EMBODIMENTS

Embodiments of the present invention advantageously address the foregoing requirements and needs, as well as others, by providing a test system and a corresponding test method for Internet-of-Things (IoT) end-to-end (e2e) testing that ensure both a high flexibility and an increased efficiency.

According to a first aspect of the invention, a test system for IoT e2e testing is provided. The test system comprises a network simulator, and a device under test adapted to initiate a communication with the network simulator and to send a Domain Name System (DNS) query and/or a Message Queue Telemetry Transport (MQTT) request to the network simulator. In this context, the network simulator is adapted to determine a platform according to which the device under test intends to communicate based on the Domain Name System query and/or the Message Queue Telemetry Transport request. Advantageously, testing can thereby be performed in an efficient and flexible manner.

According to a first implementation form of the provided test system, the communication initiated by the device under test with the network simulator may comprise an Internet Protocol (IP) connectivity. Advantageously, the inventive test system thereby allows for investigating IP based communication.

According to a further implementation form of the provided test system, the communication initiated by the device under test with the network simulator may comprise a wireless connectivity. Advantageously, the inventive test system allows for over-the-air testing.

According to a further implementation form of the provided test system, the network simulator is further adapted to auto configure itself according to the determined platform. Further, the auto configuration of the network simulator may comprise an adjustment of at least one simulation parameter, wherein the at least one simulation parameter may suitably be chosen on the basis of the determined platform. Advantageously, testing efficiency can thereby be further increased.

According to a further implementation form of the first aspect of the invention, the platform may comprise a simulated platform. Alternatively, the platform may be a simulated platform. Advantageously, for instance, with the aid of a simulated platform, costs can be reduced.

According to a further implementation form of the provided test system, the platform may comprise an IoT platform, such as an IoT simulated platform, and/or an IoT server. Alternatively, the platform may be an IoT platform, such as an IoT simulated platform, and/or an Internet-of-Things server. Advantageously, IoT capabilities can thereby be investigated in a particularly accurate manner.

According to a further implementation form of the provided test system, the platform may comprise a Message Queue Telemetry Transport server. Alternatively, the platform may be a Message Queue Telemetry Transport server. Advantageously, Message Queue Telemetry Transport capabilities can thereby be investigated in a particularly accurate manner.

According to a further implementation form of the provided test system, the platform may comprise a Constrained Application Protocol (CoAP) server. Alternatively, the platform may be a CoAP server. Advantageously, Constrained Application Protocol capabilities can thereby be investigated in a particularly accurate manner.

According to a further implementation form of the provided test system, the platform may comprise a Machine-to-Machine server (M2M), such as a Lightweight Machine-to-Machine (LWM2M) server. Alternatively, the platform may be an M2M server, such as an LWM2M server. Advantageously, Machine-to-Machine capabilities or Lightweight Machine-to-Machine capabilities, respectively, can thereby be investigated in a particularly accurate manner.

According to a second aspect of the invention, a test method for IoT e2e testing is provided. The test method comprises the steps of initiating a communication with a network simulator with the aid of a device under test, sending a Domain Name System query and/or a Message Queue Telemetry Transport request to the network simulator with the aid of the device under test, and determining a platform according to which the device under test intends to communicate with the aid of the network simulator based on the Domain Name System query and/or the Message Queue Telemetry Transport request. Advantageously, testing can thereby be performed in an efficient and flexible manner.

According to a first implementation form of the provided test method, the communication initiated by the device under test with the network simulator may comprise an Internet Protocol connectivity. Advantageously, the test method thereby allows for investigating IP based communication.

According to a further implementation form of the provided test method, the communication initiated by the device under test with the network simulator may comprise a wireless connectivity. Advantageously, the test method thereby allows for over-the-air testing.

According to a further implementation form of the provided test method, the network simulator is adapted to auto configure itself according to the determined platform. Further, the auto configuration of the network simulator may comprise an adjustment of at least one simulation parameter, wherein the at least one simulation parameter may suitably be chosen on the basis of the determined platform. Advantageously, testing efficiency can thereby be further increased.

According to a further implementation form of the provided test method, the platform may comprise a simulated platform. Alternatively, the platform may be a simulated platform. Advantageously, for instance, with the aid of a simulated platform, costs can be reduced.

According to a further implementation form of the provided test method, the platform may comprise an IoT platform, such as an IoT simulated platform, and/or an IoT server. Alternatively, the platform may be an IoT platform, such as an IoT simulated platform, and/or an IoT server. Advantageously, IoT capabilities can thereby be investigated in a particularly accurate manner.

According to a further implementation form of the provided test method, the platform may comprise a Message Queue Telemetry Transport server. Alternatively, the platform may be a Message Queue Telemetry Transport server. Advantageously, Message Queue Telemetry Transport capabilities can thereby be investigated in a particularly accurate manner.

According to a further implementation form of the provided test method, the platform may comprise a Constrained Application Protocol (CoAP) server. Alternatively, the platform may be a CoAP server. Advantageously, Constrained Application Protocol capabilities can thereby be investigated in a particularly accurate manner.

According to a further implementation form of the provided test method, the platform may comprise a Machine-to-Machine (M2M) server, such as a Lightweight Machine-to-Machine (LWM2M) server. Alternatively, the platform may be an M2M server, such as an LWM2M server. Advantageously, Machine-to-Machine capabilities or Lightweight Machine-to-Machine capabilities, respectively, can thereby be investigated in a particularly accurate manner.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A test system and a corresponding test method for Internet-of-Things (IoT) end-to-end (e2e) testing, which ensure both a high flexibility and an increased efficiency, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
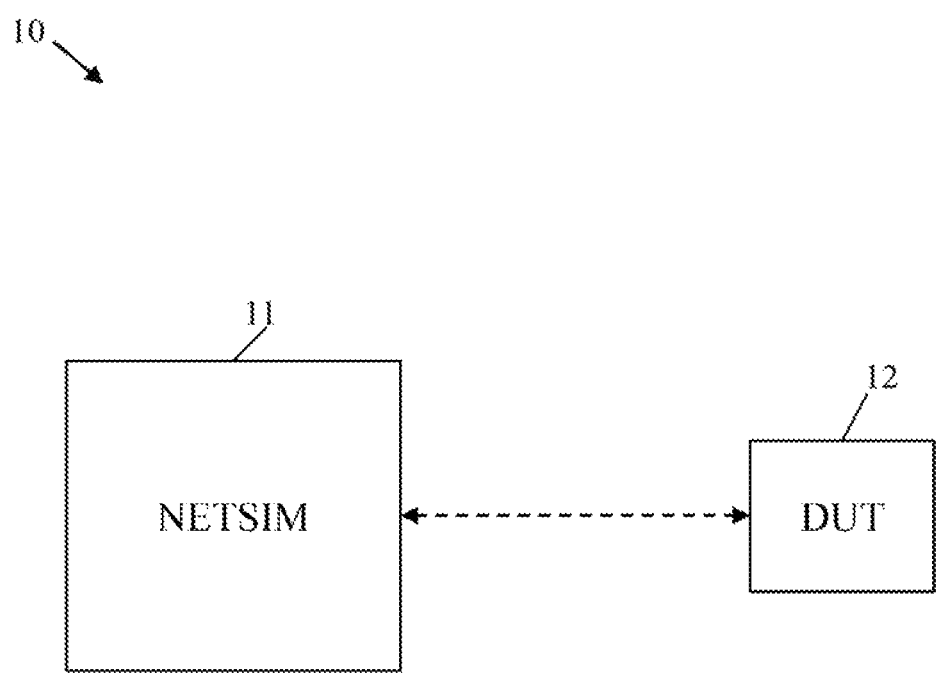
FIG. 1 shows an example test system for Internet-of-Things (IoT) end-to-end (e2e) testing according to example embodiments of the present invention.

FIG. 1 shows an example test system 10 for Internet-of-Things (IoT) end-to-end (e2e) testing according to example embodiments of the present invention. The test system 10 comprises a network simulator 11, and a device under test 12. The device under test is adapted to initiate a communication with the network simulator 11 and to send a Domain Name System (DNS) query and/or a Message Queue Telemetry Transport (MQTT) request to the network simulator 11. In this context, the network simulator 11 is adapted to determine a platform according to which the device under test 12 intends to communicate based on the Domain Name System query and/or the Message Queue Telemetry Transport request.

In this context, the communication initiated by the device under test 12 with the network simulator 11 may comprise an Internet Protocol (IP) communication. Additionally, the communication may be a bidirectional communication.

In addition to this or as an alternative, the communication initiated by the device under test 12 with the network simulator 11 may comprise a wireless communication.

Moreover, the network simulator 11 may further be adapted to auto configure itself according to the determined platform.

Additionally or alternatively, the platform may comprise a simulated platform. As an alternative to this, the platform may be a simulated platform.

In further addition to this or as a further alternative, the platform may comprise an IoT platform, such as an IoT simulated platform, and/or an IoT server. Alternatively, the platform may be an IoT platform, such as an IoT simulated platform, and/or an IoT server.

Moreover, the platform may additionally or alternatively comprise a Message Queue Telemetry Transport server. As an alternative to this, the platform may be a Message Queue Telemetry Transport server.

Further additionally or alternatively, the platform may comprise a Constrained Application Protocol (CoAP) server. As an alternative to this, the platform may be a CoAP server.

The platform may additionally or alternatively comprise a Machine-to-Machine server (M2M), such as a Lightweight Machine-to-Machine (LWM2M) server. Alternatively, the platform may be an M2M server, such as an LWM2M server.

Figure 2:
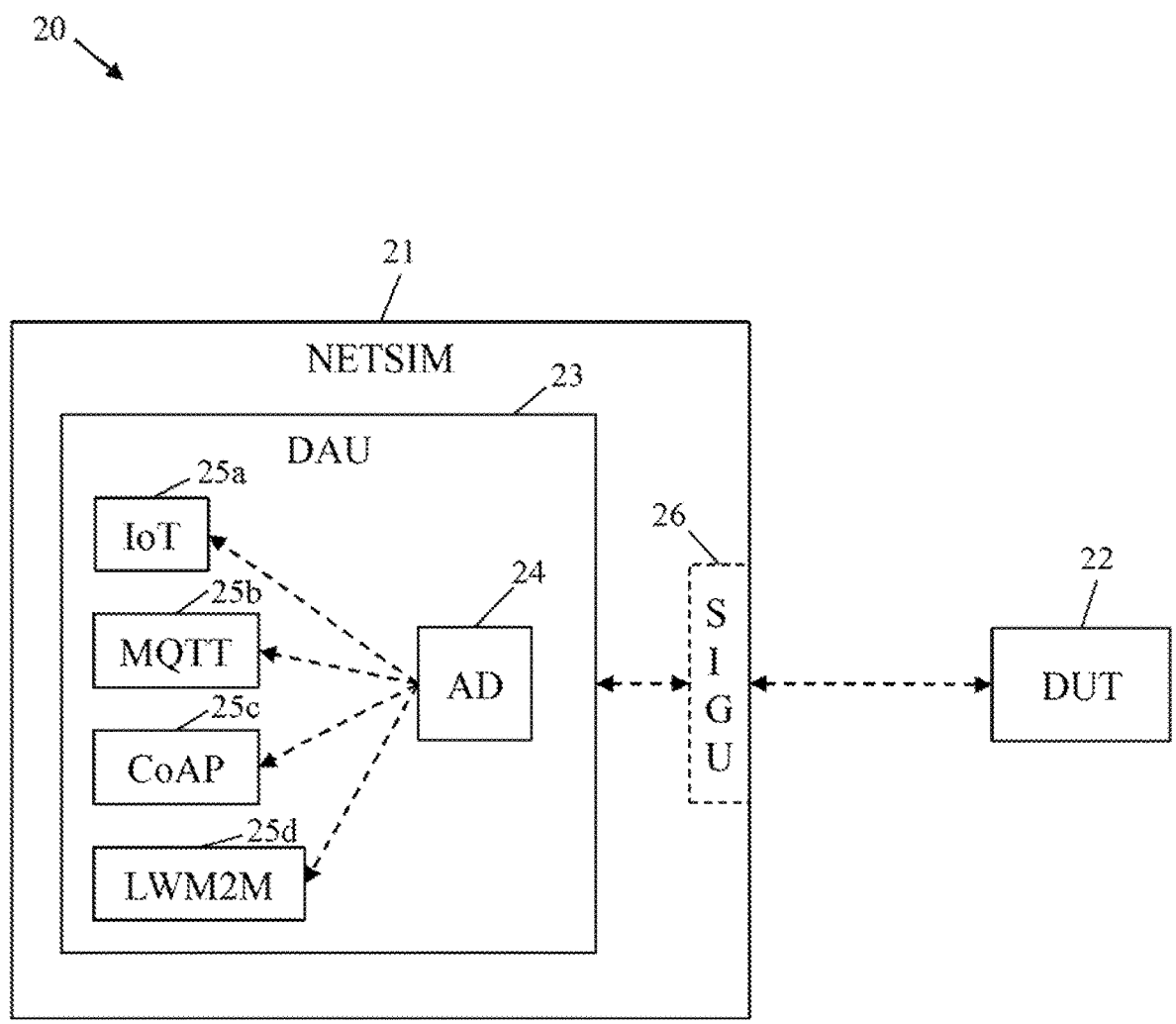
FIG. 2 shows a further example test system for Internet-of-Things (IoT) end-to-end (e2e) testing according to example embodiments of the present invention.

FIG. 2 shows a further example test system 20 for Internet-of-Things (IoT) end-to-end (e2e) testing according to example embodiments of the present invention.

The test system 20 comprises a network simulator 21 and a device under test 22. The device under test is adapted to initiate a communication with the network simulator 21 and to send a Domain Name System query and/or a Message Queue Telemetry Transport request to the network simulator 21. In this context, the network simulator 21 is adapted to determine a platform according to which the device under test 22 intends to communicate based on the Domain Name System query and/or the Message Queue Telemetry Transport request.

As it can further be seen from FIG. 2, the network simulator comprises an optional signaling unit 26 configured to provide signaling capabilities, and a data application unit 23 configured to apply data.

In this context, the device under test 22, such as an IoT device, is connected to the data applicator 23 via the signaler 26. As an alternative to this, the device under test 22 or the IoT device, respectively, may directly be connected to the data applicator 23. With respect to the indirect or direct connection, the respective communication may comprise an Internet Protocol communication. Additionally or alternatively, the respective communication may comprise a wireless communication.

Moreover, also in accordance with FIG. 2, the data applicator 23 comprises an auto discoverer 24. The auto discoverer 24 may be embodied as an auto discovery software component. As an alternative to this or in combination therewith, the auto discoverer 24 may be embodied as an auto discovery hardware component such as a Field Programmable Gate Array (FPGA), a Complex Programmable Logic Device (CPLD), a Programmable Array Logic (PAL), an Application-specific Integrated Circuit (ASIC), or any combination thereof.

In addition to this, the network simulator 21 may be further adapted to auto configure itself according to the determined platform especially with the aid of the auto discoverer 24.

In this context, the platform may comprise a simulated platform. As an alternative to this, the platform may be a simulated platform. Further alternatively, the platform may comprise or be a device manager, a simulated device manager, a device management server, a simulated device management server, or any combination thereof.

Further, the platform may comprise an IoT, such as IoT simulated platform, and/or an IoT server. FIG. 2, for example, shows an IoT server 25a. In this case, the data applicator 23 comprises the IoT server 25a.

In addition to this or as an alternative, the platform may comprise a Message Queue Telemetry Transport server. In this context, FIG. 2 illustrates that the data applicator 23 comprises the Message Queue Telemetry Transport server 25b.

Further additionally or alternatively, the platform may preferably comprise a Constrained Application Protocol (CoAP) server. In this exemplary case according to FIG. 2, the data applicator 23 comprises the CoAP server 25c.

Moreover, in further addition or as a further alternative, the platform may comprise a Machine-to-Machine (M2M) server, such as a Lightweight Machine-to-Machine (LWM2M) server. In this context, for example, the data applicator 23 comprises an LWM2M server 25d.

Generally, in the case of performing a testing, such as an e2e testing, with respect to a device under test, such as an IoT device, with the aid of at least one simulated server, it is essential to configure the at least one simulated server correctly. Therefore, each of the provided test systems and the provided test method ensures a correct and accurate configuration of the at least one simulated server. In addition to this, both the provided test system and the corresponding test method allow for automatically identifying the correct server and responding, accordingly.

Advantageously, with respect to the foregoing, embodiment of the present invention facilitate the testing of a variety of devices under test, such as IoT devices, with minimum configuration.

Figure 3:
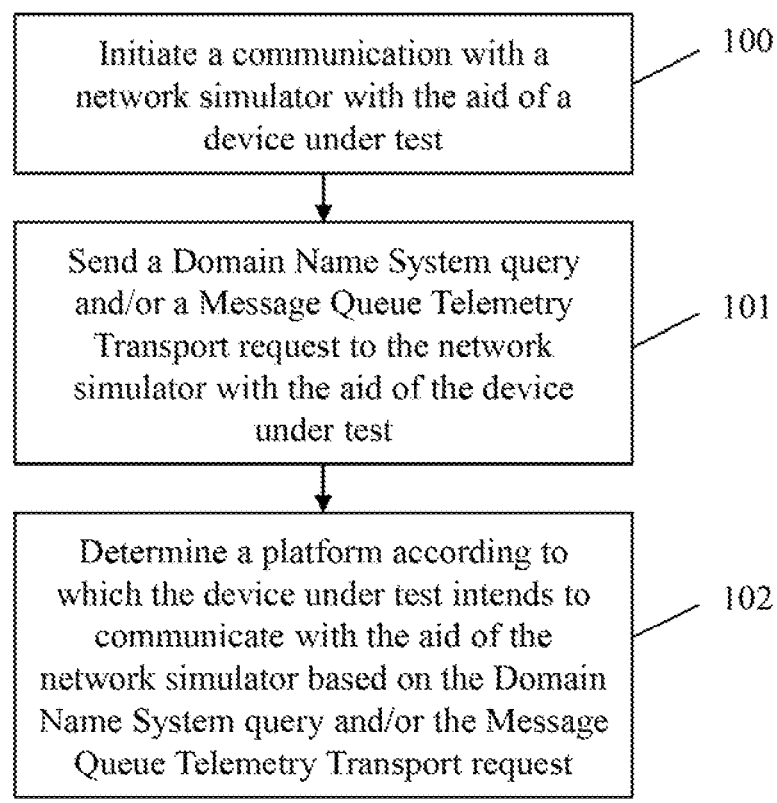
FIG. 3 shows a flow chart depicting an example test method for Internet-of-Things (IoT) end-to-end (e2e) testing according to example embodiments of the present invention.

FIG. 3 shows a flow chart depicting an example test method for Internet-of-Things (IoT) end-to-end (e2e) testing according to example embodiments of the present invention. In step 100, a communication with a network simulator is initiated with the aid of a device under test. Then, in step 101, a Domain Name System query and/or a Message Queue Telemetry Transport request is sent to the network simulator with the aid of the device under test. Further, in step 102, a platform according to which the device under test intends to communicate is determined with the aid of the network simulator based on the Domain Name System query and/or the Message Queue Telemetry Transport request.

In this context, the communication initiated by the device under test with the network simulator may comprise an Internet Protocol communication.

In addition to this or as an alternative, the communication initiated by the device under test with the network simulator may comprise a wireless communication.

Further, the network simulator may be adapted to auto configure itself according to the determined platform.

Further, the platform may comprise a simulated platform. As an alternative to this, the platform may be a simulated platform.

Moreover, the platform may comprise an IoT platform, such as an IoT simulated platform, and/or an IoT server. As an alternative to this, the platform may be an IoT platform, such as an IoT simulated platform, and/or an IoT server.

In addition to this or as an alternative, the platform may comprise a Message Queue Telemetry Transport server. Alternatively, the platform may be a Message Queue Telemetry Transport server.

Additionally or alternatively, the platform may comprise a Constrained Application Protocol server. As an alternative to this, the platform may be a Constrained Application Protocol server.

In further addition to this or as a further alternative, the platform may comprise a Machine-to-Machine (M2M) server, such as a Lightweight Machine-to-Machine (LWM2M) server. Alternatively, the platform may be an M2M server, such as an LWM2M server.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system comprising:
   a network simulator; and
   a device under test adapted to initiate a communication with the network simulator and to send one or more of a Domain Name System query and a Message Queue Telemetry Transport request to the network simulator; and
   wherein the network simulator is adapted to determine a platform according to which the device under test intends to communicate based on the one or more of the Domain Name System query and the Message Queue Telemetry Transport request, with the aid of an auto discoverer of a data applicator of the network simulator.

2. The test system according to claim 1, wherein the communication initiated by the device under test with the network simulator comprises an Internet Protocol communication.

3. The test system according to claim 1, wherein the communication initiated by the device under test with the network simulator comprises a wireless communication.

4. The test system according to claim 1, wherein the network simulator is further adapted to auto configure itself according to the determined platform.

5. The test system according to claim 1, wherein the platform comprises a simulated platform.

6. The test system according to claim 1, wherein the platform comprises one or more of an Internet-of-Things platform and an Internet-of-Things server.

7. The test system according to claim 1, wherein the platform comprises a Message Queue Telemetry Transport server.

8. The test system according to claim 1, wherein the platform comprises a Constrained Application Protocol server.

9. The test system according to claim 1, wherein the platform comprises a Machine-to-Machine server.

10. A test method comprising:
    initiating, by a device under test, a communication with a network simulator;
    sending, by the device under test, one or more of a Domain Name System query and a Message Queue Telemetry Transport request to the network simulator; and
    determining, by the network simulator, a platform according to which the device under test intends to communicate based on the one or more of the Domain Name System query and the Message Queue Telemetry Transport request, with the aid of an auto discoverer of a data applicator of the network simulator.

11. The test method according to claim 10, wherein the communication initiated by the device under test with the network simulator comprises an Internet Protocol communication.

12. The test method according to claim 10, wherein the communication initiated by the device under test with the network simulator comprises a wireless communication.

13. The test method according to claim 10, wherein the network simulator is adapted to auto configure itself according to the determined platform.

14. The test method according to claim 10, wherein the platform comprises a simulated platform.

15. The test method according to claim 10, wherein the platform comprises one or more of an Internet-of-Things platform and an Internet-of-Things server.

16. The test method according to claim 10, wherein the platform comprises a Message Queue Telemetry Transport server.

17. The test method according to claim 10, wherein the platform comprises a Constrained Application Protocol server.

18. The test method according to claim 10, wherein the platform comprises a Machine-to-Machine server.

* * * * *